(12) United States Patent
Takizawa et al.

(10) Patent No.: US 7,945,345 B2
(45) Date of Patent: May 17, 2011

(54) SEMICONDUCTOR MANUFACTURING APPARATUS

(75) Inventors: Masahiro Takizawa, Nagoako (JP); Tsutomu Makino, Kodaira (JP)

(73) Assignee: ASM Japan K.K., Tokyo (JP)

( * ) Notice: Subject to any disclaimer, the term of this patent is extended or adjusted under 35 U.S.C. 154(b) by 367 days.

(21) Appl. No.: 12/187,249

(22) Filed: Aug. 6, 2008

(65) Prior Publication Data

US 2010/0036517 A1    Feb. 11, 2010

(51) Int. Cl.
*G06F 19/00* (2006.01)
*G06F 11/00* (2006.01)

(52) U.S. Cl. ............. 700/110; 714/48; 714/55; 714/706

(58) Field of Classification Search .................. 700/110; 714/55, 706
See application file for complete search history.

(56) References Cited

U.S. PATENT DOCUMENTS

| | | | |
|---|---|---|---|
| 5,235,698 A | | 8/1993 | Lan |
| 5,761,414 A | * | 6/1998 | Akaishi et al. .................. 714/55 |
| 5,850,514 A | * | 12/1998 | Gonda et al. .................... 714/55 |
| 6,128,312 A | | 10/2000 | Kurosawa |
| 6,516,422 B1 | | 2/2003 | Doblar et al. |
| 6,907,540 B2 | * | 6/2005 | Kwon et al. .................. 713/502 |
| 2006/0043202 A1 | | 3/2006 | Kim et al. |
| 2006/0218312 A1 | * | 9/2006 | Takizawa et al. ............... 710/20 |
| 2008/0147228 A1 | | 6/2008 | Fenner et al. |
| 2009/0055013 A1 | | 2/2009 | Takizawa et al. |

FOREIGN PATENT DOCUMENTS

| | | | |
|---|---|---|---|
| JP | 05-81080 | | 4/1993 |
| JP | 05081080 A | * | 4/1993 |

* cited by examiner

*Primary Examiner* — Albert Decady
*Assistant Examiner* — Sivalingam Sivanesan
(74) *Attorney, Agent, or Firm* — Knobbe, Martens, Olson & Bear LLP (57) ABSTRACT

A semiconductor manufacturing apparatus includes a first program on a controller and a second program on an interface board between the controller and controlled devices. Both of the programs update their own counters and exchange their counter values with each other, serving as bi-directional software watchdog timers (WDT). If a counter value of the first program on the controller sent to the second program on the interface board is determined to be abnormal by the second program, the second program on the interface board sends commands to the controlled devices to terminate output so that the apparatus is navigated to a safe mode. The first program similarly monitors the counter values of the second program for anomalies. This bi-directional software WDT can be implemented as add-on to software programs that already exist in the controller and the interface board, therefore, this implementation does not incur extra cost of hardware of the apparatus.

19 Claims, 5 Drawing Sheets

FIG. 1

Interaction between Recipe Execution Module and Device Net Interface board inside a module controller.

Inside PMC

FIG. 2

Interaction between Device Interaction unit in an ADS board and a device.

Inside ADS board

SEMICONDUCTOR MANUFACTURING APPARATUS

BACKGROUND OF THE INVENTION

1. Field of the Invention

The present invention relates to controllers and controlled devices constituting a semiconductor manufacturing apparatus.

2. Description of the Related Art

In the production of semiconductor wafers, some unpredictable problems may occur. One such problem is the halting of a controller of a semiconductor manufacturing apparatus. Recently, conventional inexpensive personal computers (PCs) have been used as controllers. However, each component of PCs, hard disk for instance, has its own lifespan, and it cannot be used indefinitely without faults causing stoppage.

To avoid problems caused from stoppage of PC components as mentioned above, a method of detecting the stoppage of a controller using a hardware timer circuit called Watch Dog Timer (WDT) is known. This WDT is used to monitor a state of controlling program running at a controller and to detect abnormal execution of the program. A monitored program sends a reset signal to a WDT at a constant cycle. The monitored program stops outputting the reset signal when the monitored program is under a state of abnormal execution. If the WDT has not received the reset signal for a certain period of time, the WDT sends a command to stop the monitored program.

Jpn. Pat. Appln. KOKAI Publication No. H5-81080 discloses a technique of implementing the WDT function by software instead of modifying hardware structure on a microprocessor-failure monitoring apparatus so that states of a program on a microprocessor can be monitored and errors can be detected by software without causing an extra complication in hardware structure.

When a failure occurs at a controller, depending on the timing of the failure, states of devices may not be monitored, anomalies of devices may not be detected by the controller, and thus, the devices may not be terminated and this situation risks harm to equipment. For instance, if a pressure controller fails, a gas may continue flowing into a wafer processing chamber, and pressure in the processing chamber may keep increasing. Continuing operation of device functions without termination during the controller's malfunctioning may cause a serious danger not only to the semiconductor manufacturing apparatus itself, but to workers around the apparatus.

If an interface board breaks down, the program on the interface board cannot receive commands from the controller, and similarly, the uncontrolled devices may cause a dangerous situation as well.

SUMMARY OF THE INVENTION

In one aspect, a semiconductor manufacturing apparatus is provided. The apparatus includes a module controller, which is configured to control at least one device. A device interaction unit is connected between the module controller and the controlled device, and is configured to interact between the module controller and the controlled device. A first program is provided for the module controller, the first program comprising a first counter having a value that changes in each predetermined period of time. A second program is provided for the device interaction unit, the second program comprising a second counter having a value that changes in each predetermined period of time. The first program and the second program are configured to monitor each other's execution states by exchanging the first and second counters' values, to compare the values of the first and second counters, and to determine anomalies in the execution states based on a result of each comparison.

In another aspect, a method of controlling semiconductor manufacturing apparatus is provided. This method includes providing a module controller, a device interaction unit and a controlled device controlled by the module controller via the device interaction unit. A value of a first counter of a first program for the module controller is changed in a first predetermined period of time. A value of a second counter of a second program for the device interaction unit is changed in a second predetermined period of time. The second program is used to monitor execution states of the first program by receiving values of the first counter from the first program, comparing the values of the first counter, and determining anomalies in the execution state of the first program based on a result of the comparison. The first program is used to monitor execution states of the second program by receiving values of the second counter from the second program, comparing the values of the second counter, and determining anomalies in the execution state of the second program based on a result of the comparison.

In one embodiment, a semiconductor manufacturing apparatus comprises a first program on a controller and a second program on an interface board between the controller and controlled devices. Both of the programs update their own counters and exchange their counter values each other, serving as bi-directional software WDT.

In one embodiment, if a counter value of the first program on the controller sent to the second program on the interface board is determined to be abnormal by the second program, the second program on the interface board sends commands to the controlled devices to terminate output so that the apparatus is navigated to a safe mode.

In one embodiment, any counter value of the second program on the interface board sent to the first program on the controller is determined to be abnormal by the first program, the first program on the controller notifies the user of anomalies in the apparatus. This bi-directional software WDT can be implemented as add-on to software programs that already exist in the controller and the interface board, therefore, this implementation does not incur extra cost of hardware of the apparatus.

Other objects and advantages of the invention will be readily apparent from the following detailed discussion.

DETAILED DESCRIPTION OF THE PREFERRED EMBODIMENTS

Various embodiments will be described hereinafter with reference to the accompanying drawings. In general, according to one embodiment of the invention, a semiconductor manufacturing apparatus comprises at least one module controller and at least one device controlled by the module controller. An Analog Digital Sensor board (ADS board) is connected between the module controller and the controlled device and is configured to interact between the module controller and the controlled devices. The module controller is provided with a first program comprising a first counter having a value that changes each predetermined period of time. The device interaction unit is provided with a second program comprising a second counter having a value that changes in each predetermined period of time.

Figure 1:
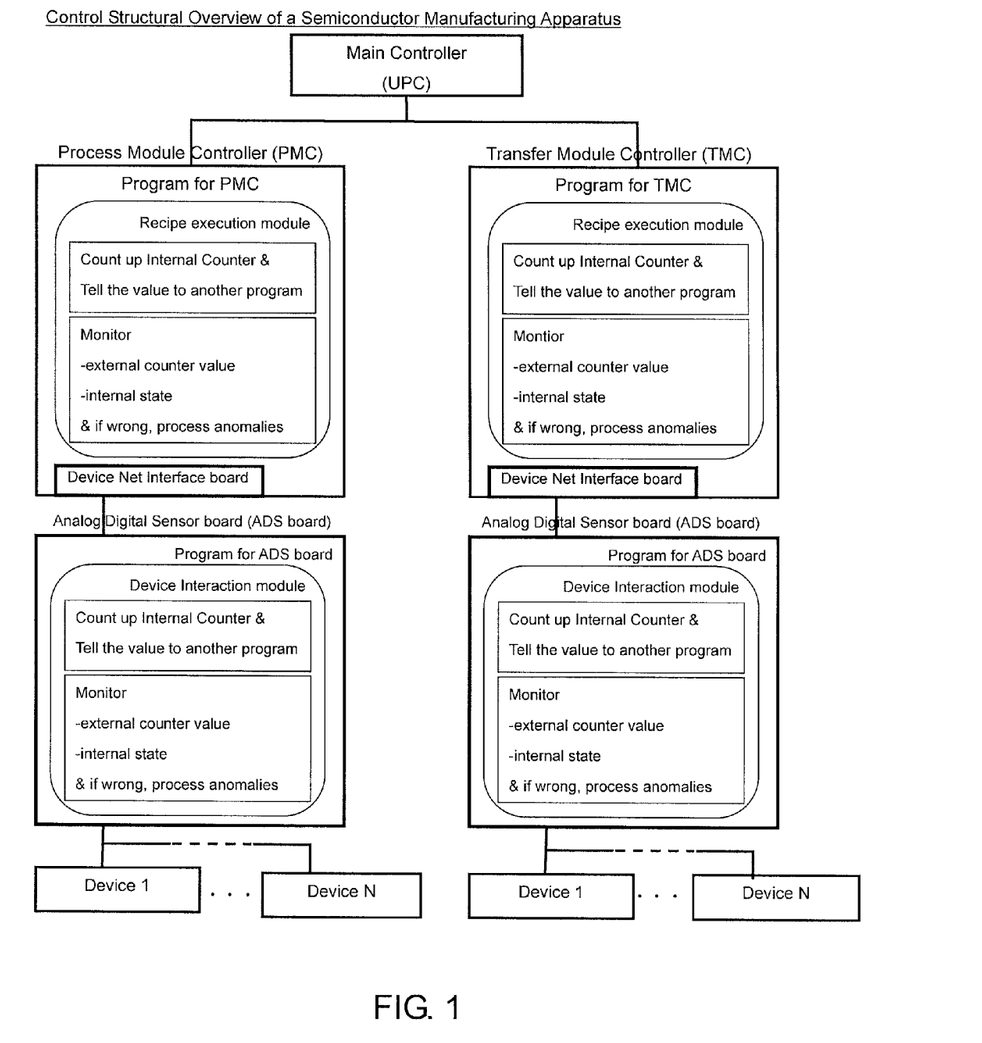
FIG. 1 is a schematic diagram of a control system used in a plasma CVD apparatus including software running watchdog timer (WDT) processes, according to an embodiment of the present invention.

FIG. 1 is a schematic diagram of a control system used in a plasma CVD apparatus including programs running software watchdog timer (WDT) processes, according to an embodiment of the present invention. For example, the plasma CVD apparatus comprises a main controller, also known as a Unique Platform Controller (UPC), and at least one module controller. In FIG. 1, two module controllers are illustrated, Process Module Controller (PMC) and Transfer Module Controller (TMC). The PMC is in charge of controlling devices related to a processing chamber in which a wafer is processed (e.g., CVD chamber). The TMC is in charge of controlling devices associated with a transfer module, such as a robot that transfers wafers. The UPC controls all the module controllers, including the PMC and the TMC.

In FIG. 1, there are a number of devices. Examples of devices controlled by the PMC include, but are not limited to, a mass flow controller (MFC) and a throttle valve for pressure control. Also the PMC and the TMC each include a Device Net Interface board. The Device Net Interface board allows each of the controllers to communicate with Input/Output ports of the devices, such as sensors and valves. The devices of FIG. 1 are often "external" or off-the-shelf devices provided by their manufacturers with their own operating software, although the methods described herein are also applicable to devices manufactured by the tool manufacturers.

Also each of the module controllers is connected to their devices via an Analog Digital Sensor board (ADS board). This ADS board is an interface board for converting analog signals from devices (e.g., a sensor) to digital signals, and the digital signals are sent to the Device Net Interface board.

Figure 2:
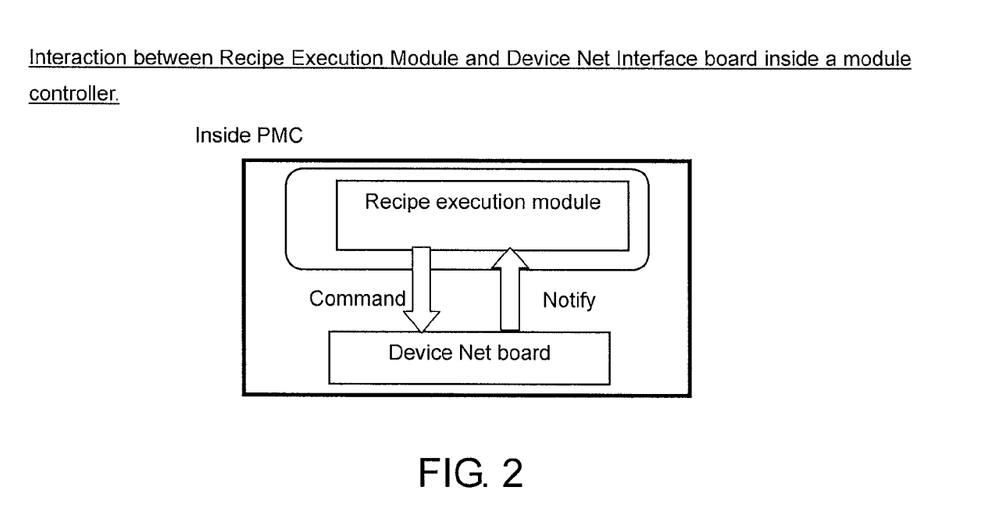
FIG. 2 is a schematic diagram showing signal flows of interaction between a recipe execution module and a Device Net Interface board in a module controller of the plasma CVD apparatus.
Figure 3:
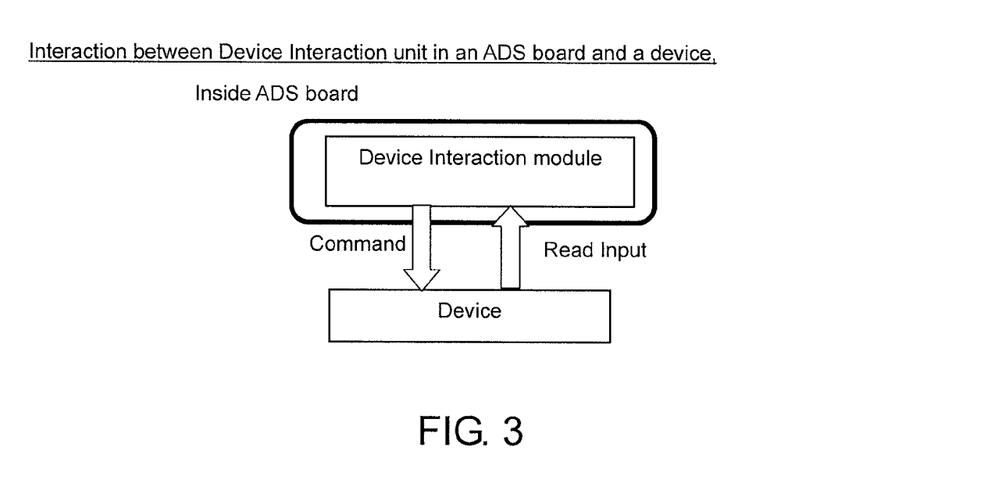
FIG. 3 is a schematic diagram showing signal flows of interaction between a device interaction module on an Analog Digital Sensor board (ADS board) and a device of the plasma CVD apparatus to be controlled.

In FIG. 1, at the PMC, a recipe execution module is executed, which sends commands to and receives notifications from the Device Net Interface board, which is also illustrated in FIG. 2. In FIG. 1 at the ADS board, a Device Interaction module is executed, which sends commands to and receives inputs from the devices, which is also illustrated in FIG. 3.

When the PMC breaks down or is not be able to produce any new command, the ADS board connected to the PMC would not be notified of the breakdown of the PMC, and therefore the ADS board keeps its operational state, following previous commands received from the PMC and the devices.

If the PMC breaks down while the apparatus is introducing a gas to the processing chamber, for example, the gas keeps on flowing into the chamber, an internal pressure of the processing chamber keeps on increasing, and eventually this can result in a dangerous situation for the apparatus and workers around the apparatus.

When the ADS board breaks down or is not be able to receive any new command from the PMC, the last operational state is maintained even though the PMC sends out new commands to the ADS board, therefore a similar dangerous situation can arise.

In the above description, the phrase "break down" addresses software malfunctioning. In FIG. 1, control software programs are executed at the PMC and the ADS board. The malfunctioning of the control software programs in the PMC and the ADS board should be addressed before damage is caused. Hardware problems such as "break down of power supply" or "a broken wire" can easily be detected by communication interface etc., unlike the software malfunctioning problems.

In order to avoid the dangerous situations caused by the software problems as described above, a programmed module is provided on the software executed by a CPU, and can be stored in memory on the PMC and the ADS board. The module operates as follows. When the PMC breaks down, the ADS board detects the breakdown of the PMC and it switches off all the outputs. On the other hand, if the ADS board breaks down, then the PMC detects the breakdown of the ADS board and the PMC notifies the state of the ADS board to a user so that the user should be able take an appropriate course, such as shutting down a power supply of either the apparatus or the controlled devices.

Figure 4:
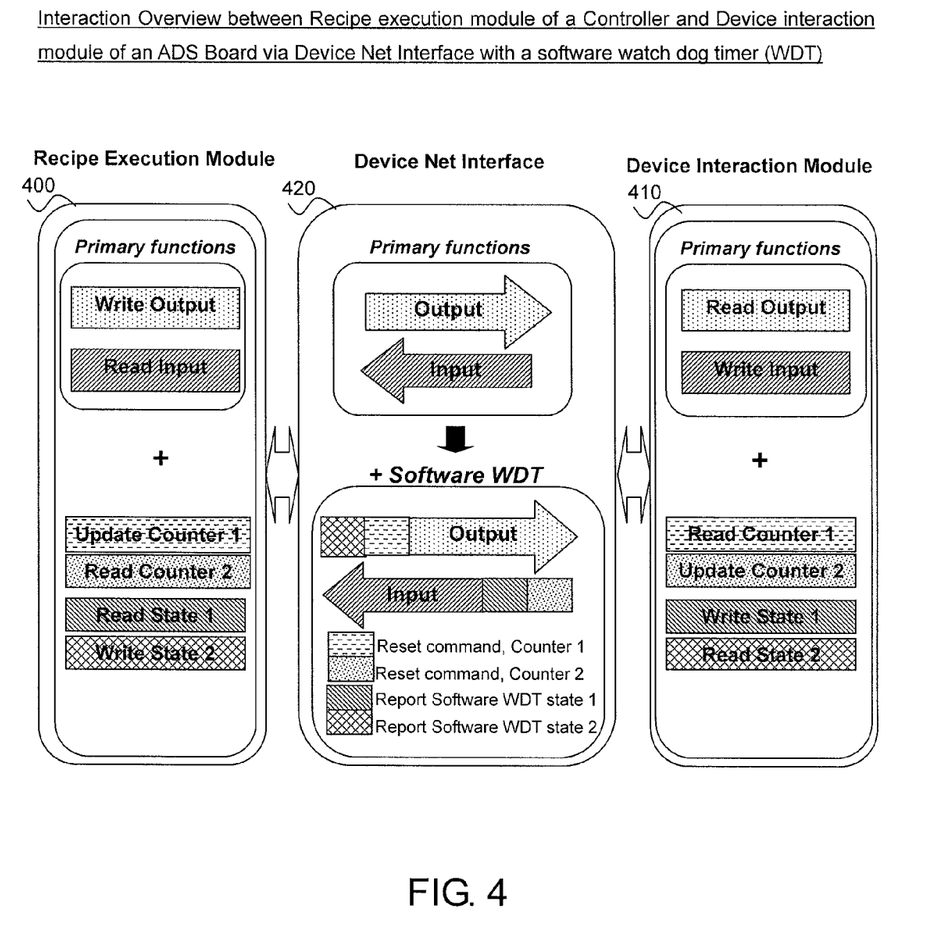
FIG. 4 is a schematic diagram showing signal flow of interaction between the recipe execution module running on a module controller and the device interaction module on the ADS board via Device Net Interface within a module controller, where the recipe execution module and the ADS board both include WDT software.

To detect the software malfunctioning problems, the illustrated embodiment introduces mutual monitoring software of the PMC and software of the ADS board. For this purpose, a bi-directional software watchdog timer (WDT) is provided. A conceptual data flow diagram of this bi-directional software WDT is shown in FIG. 4, where the lower part of each module represents WDT functionality. A recipe execution module 400 handles monitoring states of the devices being controlled by reading inputs from the controlled devices, and sending commands to the controlled devices by writing outputs. The recipe execution module 400 communicates the states and the commands to a device interaction module 410, executed at the ADS board, via a Device Net Interface 420 that resides in memory at the Device Net Interface board. Conventionally, the communication only includes the state inputs and the command outputs. The illustrated embodiment employs bi-directional software WDTs, where the recipe execution module 400 and the device interaction module 410 exchange each other's counter values as well as each other's monitored software execution states, in addition to all primary functions of communicating the state inputs and the command outputs. Because this software works in a bidirectional way, the device interaction module on the ADS board and the recipe execution module execute in a symmetrical manner.

Figure 5:
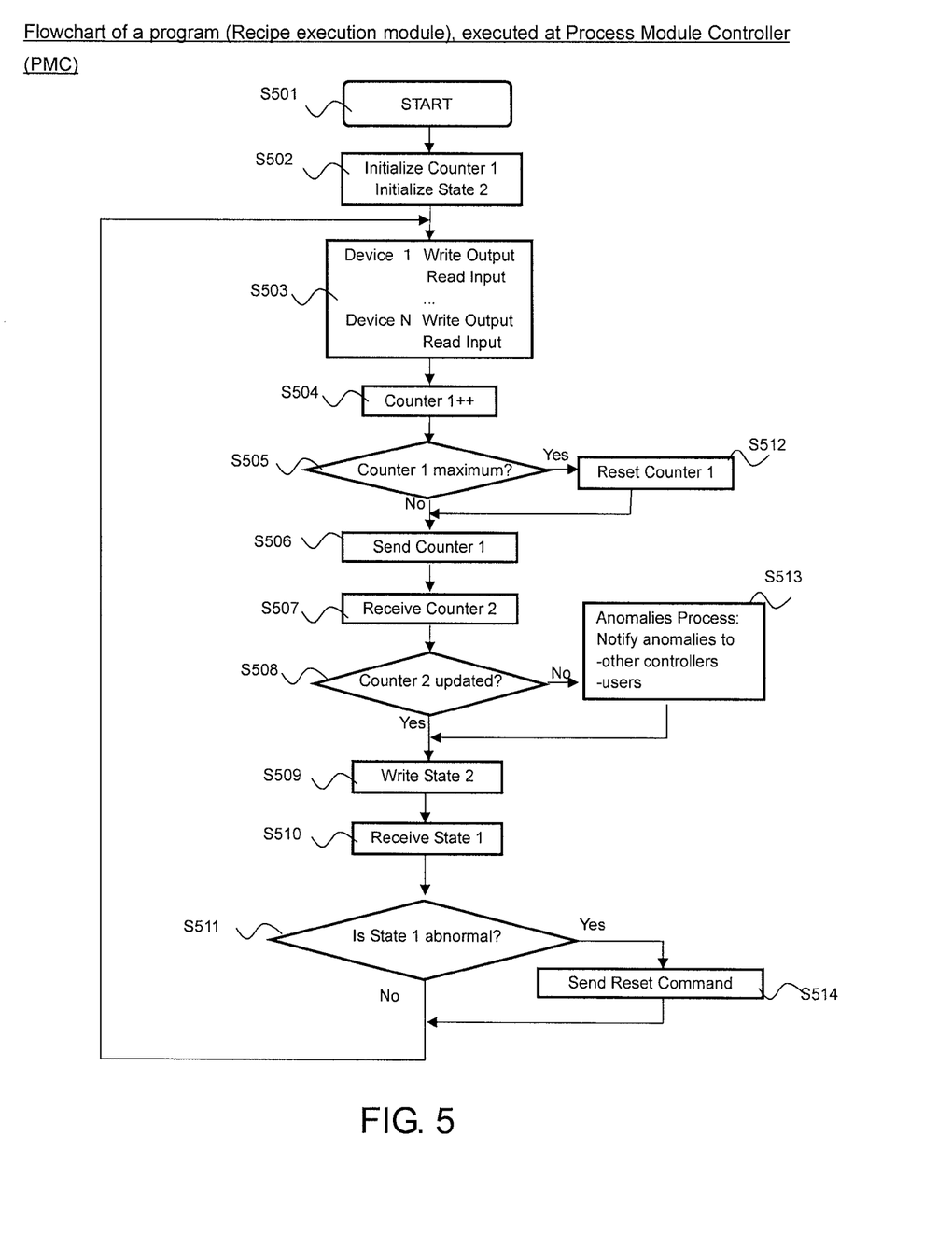
FIG. 5 is a flowchart showing a program of the recipe execution module executed at the Process Module Controller, particularly showing execution of WDT software.

In FIG. 5, the recipe execution module for a module controller comprises a looped routine provided with a counter 1 in addition to its primary functions (which include instructing wafer load/unload operations, temperature, pressure and gas flow control, etc. for a semiconductor process recipe). When the recipe execution module is started (S501), the recipe execution module initializes values of Counter 1 and State 2 which need to be initialized once before entering into a looped routine, and these values are maintained through a multiple time of loop execution once it is initialized (S502). In the loop, the primary functions such as reading input from and writing output to the device interaction module 410 (FIG. 4) via the Device Net Interface 420 (FIG. 4) are executed (S503).

The recipe execution module 400 (FIG. 4) updates the counter 1 after each predetermined period of time or cycle (FIG. 5, S504). Typically, this updating process is to increment a value of the counter 1 that starts from a first predetermined value, e.g. zero for this embodiment, once per loop. When the counter 1 reaches a second predetermined value, typically its maximum value (FIG. 5, S505), the recipe execution module sets the first predetermined value on the counter 1 (FIG. 5, S512). The updated value of the counter 1, whether or not reset, is then sent to the device interaction module (FIG. 5, S506). Then the recipe execution module 400 (FIG. 4) receives the value of the counter 2 (FIG. 5, S507) from the device interaction module 410 (FIG. 4) via the Device Net Interface 420 (FIG. 4), and monitors whether the value of the counter 2 is incremented per the determined period of time by comparison of a previous value and a current value (FIG. 5, S508). If the value of the counter 2 has not changed for a certain period of time, the recipe control module determines that the behavior of the device interaction module the ADS board is abnormal (FIG. 5, S513), at the same time, the recipe execution module executes an anomalies process, such as raising an alarm, steering the device to a safe mode, shutting the device down, notifying to recipe execution modules of other controllers of the anomalies and/or notifying a user via a user interface, so that operations of the other controllers or an apparatus itself can be terminated safely and thus the dangerous situation can be avoided. Alternatively, by the comparison between the previous and current values, if the value of the counter 2 has changed significantly for a certain period of time, which is beyond a range of sequential increments, the recipe execution module can similarly determine that the behavior of the device interaction module on the ADS board is abnormal (not shown) and take similar actions.

The recipe execution module 400 (FIG. 4) records a current state by setting a flag in "Write State 2" and sends the current state to the device interaction module 410 (FIG. 4) on the ADS board via the Device Net Interface 420 (FIG. 4) (FIG. 5, S509). Also, the recipe execution module 400 (FIG. 4) receives this detection of anomalies of the recipe execution module as State 1 from the device interaction module 410 (FIG. 4) via the Device Net Interface 420 (FIG. 4) (FIG. 5, S510). This detection of anomalies may not be processed by the recipe execution module while it is in the detected abnormal state; however, once the recipe execution module recovers from the abnormal state, the device interaction module recognizes that it had been in the abnormal state (FIG. 5, S511) and sends a reset command of the abnormal flag to the device interaction module (FIG. 5, S514).

Figure 6:
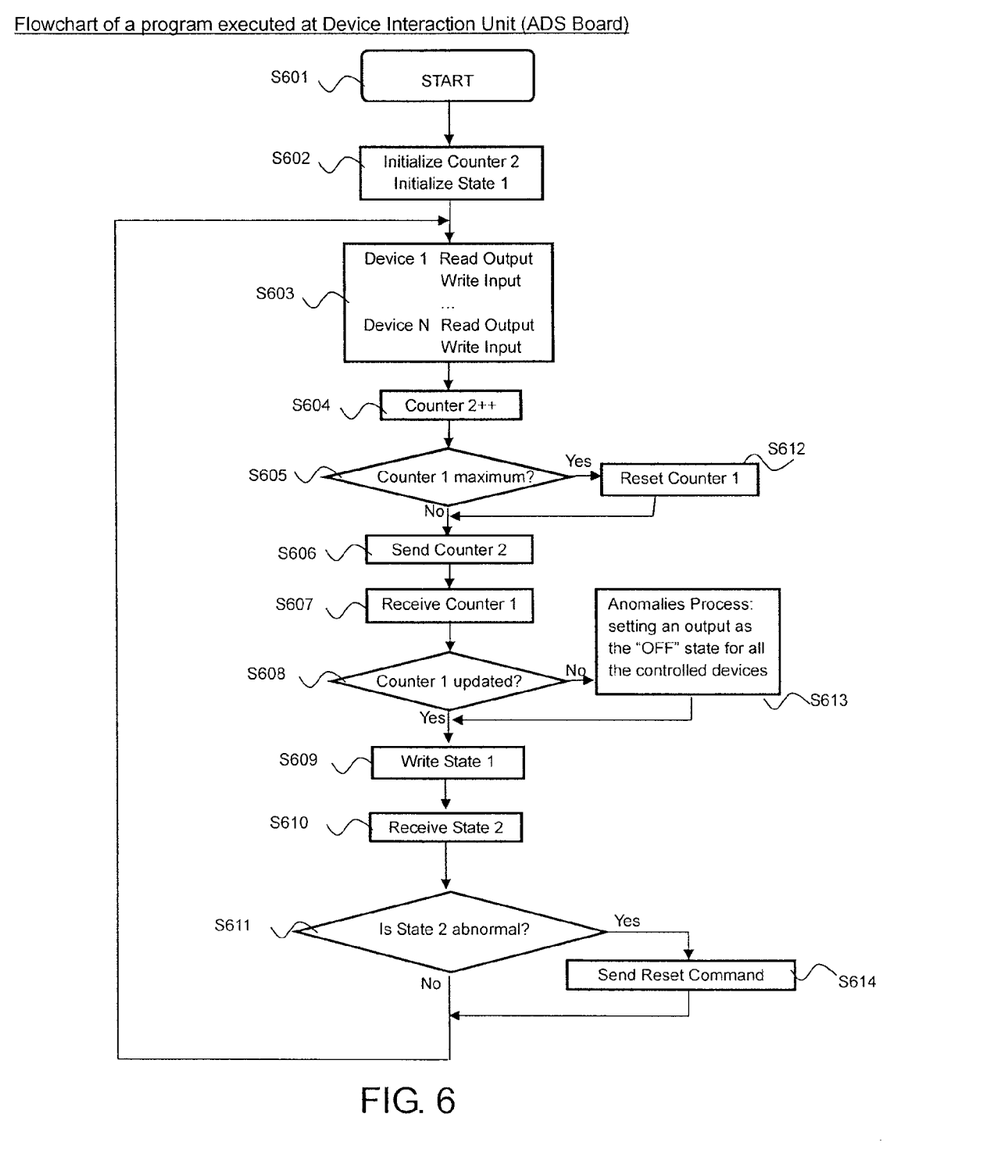
FIG. 6 is a flowchart showing a program of the device interaction module executed at the Analog Digital Sensor board (ADS board), particularly showing execution of WDT software.

In FIG. 6, the device interaction module executed at the ADS board comprises a looped routine provided with the counter 2 in addition to its primary functions (including, interfacing with various external or otherwise auxiliary devices. When the device interaction module is started (S601), the device interaction module initializes values of Counter 2 and State 1 which need to be initialized once before entering into a looped routine, and these values are maintained through a multiple time of loop execution once it is initialized (S602). In the loop, the primary functions such as reading output from and writing input to the recipe execution module 400 (FIG. 4) via the Device Net Interface 420 (FIG. 4) are executed (S603).

The device interaction module 410 (FIG. 4) updates the counter 2 after each predetermined period of time or cycle (FIG. 6, S604). Typically, this updating process is to increment a value of the counter 2 that starts from a first predetermined value, e.g. zero for this embodiment, once per loop. When the counter 2 reaches a second predetermined value, typically its maximum value (FIG. 6, S605), the device interaction module sets a first predetermine value on the counter 2 (FIG. 6, S612). The updated value of the counter 2, whether or not reset, is then sent to the recipe interaction module 400 (FIG. 4) (FIG. 6, S606). Then the device interaction module 410 (FIG. 4) on the ADS board receives the value of the counter 1 (FIG. 6, S607) from the recipe execution module 400 (FIG. 4) via the Device Net Interface 420 (FIG. 4), and monitors whether the value of the counter 1 is incremented per the determined period of time by comparison of a previous value and a current value (FIG. 6, S608). If the value of the counter 1 has not changed for a certain period of time, the device interaction module on the ADS board determines that the behavior of the recipe execution module is abnormal (FIG. 6, S613), at the same time, the device interaction module on the ADS board execute an anomalies process, such as shutting down all the controlled devices by setting an output as the "OFF" state, so that operations of the devices are terminated safely and thus the dangerous situation can be avoided. Alternatively, by the comparison between the previous and current values, if the value of the counter 1 has changed significantly for a certain period of time, which is beyond a range of sequential increments, the device interaction module can similarly determine that the behavior of the recipe execution module is abnormal (not shown) and take similar actions.

The device interaction module 410 (FIG. 4) on the ADS board records the abnormal state by setting an abnormal flag and sends this detection of anomalies of the recipe execution module 400 (FIG. 4) to the recipe execution module via the Device Net Interface 420 (FIG. 4) in "Write State 1" (FIG. 6, S609). Also the device interaction module 410 (FIG. 4) on the ADS board also receives this detection of anomalies of the device interaction module as State 2 from the recipe execution module 400 (FIG. 4) via the Device Net Interface 420 (FIG. 4) (FIG. 6, S610). This detection of anomalies may not be processed by the device interaction module while it is in the detected abnormal state; however, once the device interaction module recovers from the abnormal state, the device interaction module recognizes that it had been in the abnormal state (FIG. 6, S611) and sends a reset command of the abnormal flag to the recipe execution module (FIG. 6, S614).

Although this invention has been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying mode of the disclosed invention. Thus it is intended that the scope of at least some of the present invention herein disclosed should not be limited by the particular disclosed embodiment described above.

What is claimed is:

1. A semiconductor manufacturing apparatus comprising:
   a module controller which is configured to control at least one device;

a device interaction unit that is connected between the module controller and the controlled device and is configured to interact between the module controller and the controlled devices;

a first program for the module controller, the first program comprising a first counter having a value that changes in a first predetermined period of time; and a second program for the device interaction, the second program comprising a second counter having a value that changes in a second predetermined period of time;

wherein the first program and the second program are configured to monitor each other's execution states by exchanging the first and second counters' values, to compare the values of the first and second counters in bidirectional comparisons, and to determine anomalies in the execution states based on a result of each comparison.

2. The semiconductor manufacturing apparatus according to claim 1, wherein the first and the second programs are configured to store a previous value and a current value of the second and first counters' values respectively, to compare the current value with the previous value of the second and the first counters respectively, and to evaluate a change of the second and the first counters respectively for detecting anomalies in the execution states.

3. The semiconductor manufacturing apparatus according to claim 2, wherein the comparison of the first counter values is executed by checking the previous and the current values of the first counter whether difference between the previous and the current values of the first counter is within a predetermined range of sequential increments, and when the comparison result is not true, the second program is configured to detect an abnormal execution of the first program and to execute an anomalies process; and the comparison of the second counter values is executed by checking the previous and the current values of the second counter whether difference between the previous and the current values of the second counter is within a predetermined range of sequential increments, and when the comparison result is not true, the first program is configured to detect an abnormal execution of the second program and to execute an anomalies process.

4. The semiconductor manufacturing apparatus according to claim 2, wherein the comparison of the first counter values is executed by checking whether the previous and the current value of the first counter is equal, and when the comparison result is true, the second program is configured to detect an abnormal execution of the first program and to execute an anomalies process; and the comparison of the second counter values is executed by checking whether the previous and the current value of the second counter is equal, and when the comparison result is true, the first program is configured to detect an abnormal execution of the second program and to execute an anomalies process.

5. The semiconductor manufacturing apparatus according to claim 1, wherein the first and second counters are configured to change values by incrementing their values in first and second looped routines in the first and second programs respectively.

6. The semiconductor manufacturing apparatus according to claim 1, wherein the value of each counter is reset to a first predetermined value once it reaches to a second predetermined value.

7. The semiconductor manufacturing apparatus according to claim 6, wherein the first predetermined value is zero, and the second predetermined value is a maximum value of each counter.

8. The semiconductor manufacturing apparatus according to claim 1, wherein the second program on the device interaction unit is configured to navigate the controlled device to a safe mode/state at detecting the anomalies in the execution states occurred in either the first or second program.

9. The semiconductor manufacturing apparatus according to claim 1, wherein the apparatus is configured to immediately notify of the detected anomalies in the executed states of either the first or second program to a user of the apparatus.

10. The semiconductor manufacturing apparatus according to claim 1, wherein the apparatus is a plasma CVD apparatus.

11. A method of controlling semiconductor manufacturing apparatus comprising:

providing a module controller, a device interaction unit and a controlled device controlled by the module controller via the device interaction unit;

changing a value of a first counter of a first program for the module controller in a first predetermined period of time;

changing a value of a second counter of a second program for the device interaction unit in a second predetermined period of time;

using the second program to monitor execution states of the first program by receiving values of the first counter from the first program, comparing the values of the first counter, and determining anomalies in the execution state of the first program based on a result of the comparison; and using the first program to monitor execution states of the second program by receiving values of the second counter from the second program, comparing the values of the second counter, and determining anomalies in the execution state of the second program based on a result of the comparison.

12. The method of claim 11, further comprising:

storing a previous value and a current value of the first counter in the second program;

comparing between the current value and the previous value of the first counter in the second program; and evaluating a change of the first counter for detecting anomalies in the execution states of the first program by the second program;

storing a previous value and a current value of the second counter in the first program;

comparing between the current value and the previous value of the second counter in the first program; and evaluating a change of the second counter for detecting anomalies in the execution states of the second program by the first program.

13. The method of claim 12, further comprising:

checking the previous and the current values of the counterpart counter whether difference between the previous and the current values of the counterpart counter is within a predetermined range of sequential increments, and detecting an abnormal execution of the counterpart program and to execute an anomalies process and when the comparison result is not true.

14. The method of claim 12, further comprising:
checking the previous and the current values of the counterpart counter whether the previous and the current value of the counterpart counter is equal; and
detecting an abnormal execution of the counterpart program and to execute an anomalies process, and when the comparison result is true.

15. The method of claim 11, further comprising:
changing values the first and second counters by incrementing their values in first and second looped routines in the first and second programs.

16. The method of claim 11, further comprising:
resetting the value of each counter is to a first predetermined value once it reaches to a second predetermined value.

17. The method of claim 16, wherein the first predetermined value is zero, and the second predetermined value is a maximum value of each counter.

18. The method of claim 11, further comprising:
navigating the controlled device to a safe mode/state at detecting the anomalies in the execution states occurred in either the first or second program.

19. The method of the semiconductor manufacturing apparatus according to claim 11, further comprising:
notifying immediately of the detected anomalies in the executed states of either the first or second program to a user of the apparatus.

* * * * *